United States Patent
Ungerboeck et al.

(10) Patent No.: US 8,213,611 B2
(45) Date of Patent: Jul. 3, 2012

(54) TWO-STAGE BLOCK SYNCHRONIZATION AND SCRAMBLING

(75) Inventors: Gottfried Ungerboeck, Langnau a.A. (CH); Scott Richard Powell, Carlsbad, CA (US); Ba-Zhong Shen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1288 days.

(21) Appl. No.: 11/255,698

(22) Filed: Oct. 21, 2005

(65) Prior Publication Data

US 2006/0093146 A1     May 4, 2006

Related U.S. Application Data (60) Provisional application No. 60/624,557, filed on Nov. 3, 2004.

(51) Int. Cl.
| | |
|---|---|
| *H04L 9/12* | (2006.01) |
| *H04L 9/16* | (2006.01) |
| *H04L 9/24* | (2006.01) |
| *G06F 7/58* | (2006.01) |
| *G06F 1/02* | (2006.01) |
| *H04L 9/08* | (2006.01) |

(52) U.S. Cl. .......... 380/46; 380/268; 708/250; 708/252; 708/254

(58) Field of Classification Search ................... 380/268, 380/46; 708/252, 254
See application file for complete search history.

(56) References Cited

U.S. PATENT DOCUMENTS

| | | | |
|---|---|---|---|
| 4,383,322 A | 5/1983 | Halpern | |
| 4,771,463 A | 9/1988 | Beeman | |
| 5,046,036 A * | 9/1991 | Tezuka | 708/253 |
| 5,349,611 A | 9/1994 | Varian | |
| 5,754,651 A * | 5/1998 | Blatter et al. | 380/241 |
| 5,790,487 A * | 8/1998 | Moriya et al. | 369/47.23 |
| 5,966,450 A | 10/1999 | Hosford et al. | |
| 6,052,466 A * | 4/2000 | Wright | 380/262 |
| 6,052,786 A * | 4/2000 | Tsuchida | 726/14 |

(Continued)

FOREIGN PATENT DOCUMENTS

EP    0 331 115 A2    9/1989

OTHER PUBLICATIONS

Extended European Search Report: EP 05 02 3322 dated Feb. 27, 2012, 6 pages.

*Primary Examiner* — Matthew Henning
(74) *Attorney, Agent, or Firm* — Garlick & Markison; Holly L. Rudnick

(57) ABSTRACT

A two-stage block synchronization and scrambling module includes a synchronization PRNG module, a scramble PRNG module, a summing module, and a storage module. The synchronization PRNG module is clocked once per N+1 bit PCS frame (N arbitrary) to produce a synchronization bit and a pseudo-random starting state for the scramble PRNG. The scramble PRNG module is clocked N times per PCS frame to produce a cipher stream starting with a pseudo-random state from the synchronization PRNG. The summing module is operably coupled to sum the cipher stream and a PCS frame payload to produce scrambled payload. The storage module is operably coupled to store the scrambled payload with the synchronization bit. Synchronization bits from successive frames are a running bit-serial representation of the synchronization PRNG state and are used by the receiver to synchronize with the transmit scrambler.

20 Claims, 6 Drawing Sheets

U.S. PATENT DOCUMENTS

| | | | |
|---|---|---|---|
| 6,282,181 B1 * | 8/2001 | Stark et al. | 370/335 |
| 6,339,781 B1 * | 1/2002 | Sasaki | 708/252 |
| 6,731,692 B1 * | 5/2004 | Bhoja | 375/286 |
| 7,206,797 B2 * | 4/2007 | Gressel et al. | 708/250 |
| 7,599,976 B1 * | 10/2009 | Logue et al. | 708/250 |
| 2002/0097868 A1 * | 7/2002 | Watanabe et al. | 380/46 |
| 2004/0179682 A1 * | 9/2004 | Soliman | 380/44 |

* cited by examiner

TWO-STAGE BLOCK SYNCHRONIZATION AND SCRAMBLING

This invention is claiming priority under 35 USC §119 to provisionally filed patent application having the same title as the present patent application, a provisional filing date of Nov. 3, 2004, and a provisional Ser. No. of 60/624,557.

BACKGROUND OF THE INVENTION

1. Technical Field of the Invention

This invention relates generally to data communications and more particularly to synchronization and scrambling of frames of Ethernet data communications.

2. Description of Related Art

As is known, Ethernet is a standard that defines data conveyance protocols for data transmissions in Local Area Networks (LAN) and has multiple variations thereof depending on desired data rates and transmission media. The Ethernet standard IEEE 802.3 defines a variety of physical layer specifications for metallic and fiber-optic cables. For example, the specifications for metallic twisted-pair cables include 10 BASE-T (10 megabit-per-second (Mbit/s)), 100 BASE-TX (100 Mbit/s), and 1000 BASE-T (1 gigabit-per-second (Gbit/s)). A new specification 10GBASE-T (10 Gbit/s) is under development.

LANs based on the Ethernet standard typically exhibit a star topology with point-to-point links between a switch or hub and attached stations, although in some cases, a bus topology may be employed.

As is also known, transmitted modulation symbols must be randomized to avoid data-dependent spectral characteristics of the transmitted signal and allow for proper timing recovery and synchronization. The process of randomization is also known as scrambling. There exist two forms of scrambling, self-synchronizing scrambling and cipher-stream scrambling. With self-synchronizing scrambling, a sequence of binary symbols is divided by a scrambling polynomial in the transmitter and then multiplied by the same scrambling polynomial in the receiver. The advantage of this scrambling method is that no additional synchronization is required. On the other hand, self-synchronization has the disadvantage of error multiplication because every erroneously received binary symbol induces a finite number of additional errors in the descrambled binary sequence. With cipher-stream scrambling, in the transmitter a pseudo-random scrambling sequence is added modulo-2 to the sequence of binary data symbols. In the receiver, the same scrambling sequence is again added modulo-2 to recover the original binary data sequence. In the case of transmission errors no error multiplication occurs, which makes cipher-stream scrambling a preferred scrambling method. However, cipher-stream scrambling requires the synchronous generation of the same scrambling sequence in the transmitter and the receiver.

Therefore, a need exists for a method and apparatus which enables the efficient generation of a scrambling sequence for cipher-stream scrambling and descrambling in frame based data transmission systems.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

The invention is concerned with a two-stage block synchronization and scrambling method. According to this method, fixed-size frames of 1+N bits are transmitted. One bit is used for synchronization and the remaining N bits represent scrambled data bits.

In the transmitter two units for generating pseudo-random binary sequences are employed, denoted synchronization PRNG (pseudo-random number generator) and scramble PRNG. The synchronization PRNG is clocked once per frame and thereby generates for the n-th frame a synchronization bit $b_n$, which is inserted into the frame. Simultaneously, the synchronization PRNG transitions to a new state $s_n$, which is represented by an m-tuple of bits according to the construction of the synchronization PRNG. The state $s_n$ is used as a seed value for the scramble PRNG, which is then clocked N times to produce a pseudo-random scrambling sequence $\{c_{n,1}, c_{n,2}, c_{n,3}, \ldots c_{n,N}/s_n\}$ uniquely determined by $s_n$. The scrambling sequence is bit-wise added modulo-2 to the N data bits and the N scrambled data bits are inserted into the n-th frame.

The construction of the synchronization PRNG is such that in the receiver the sequence of states $s_n$ can be recovered from the received sequence of synchronization bits $b_n$. To descramble the N scrambled data bits of the n-th frame, the recovered state $s_n$ is used as a seed value for a descramble PRNG, which is identical to the scramble PRNG in the transmitter. As in the transmitter, the descramble PRNG is clocked N times to produce the sequence $\{c_{n,1}, c_{n,2}, c_{n,3}, \ldots c_{n,N}/s_n\}$. The sequence is bit-wise added modulo-2 to the N scrambled data bits to obtain the original N data bits.

Figure 1:
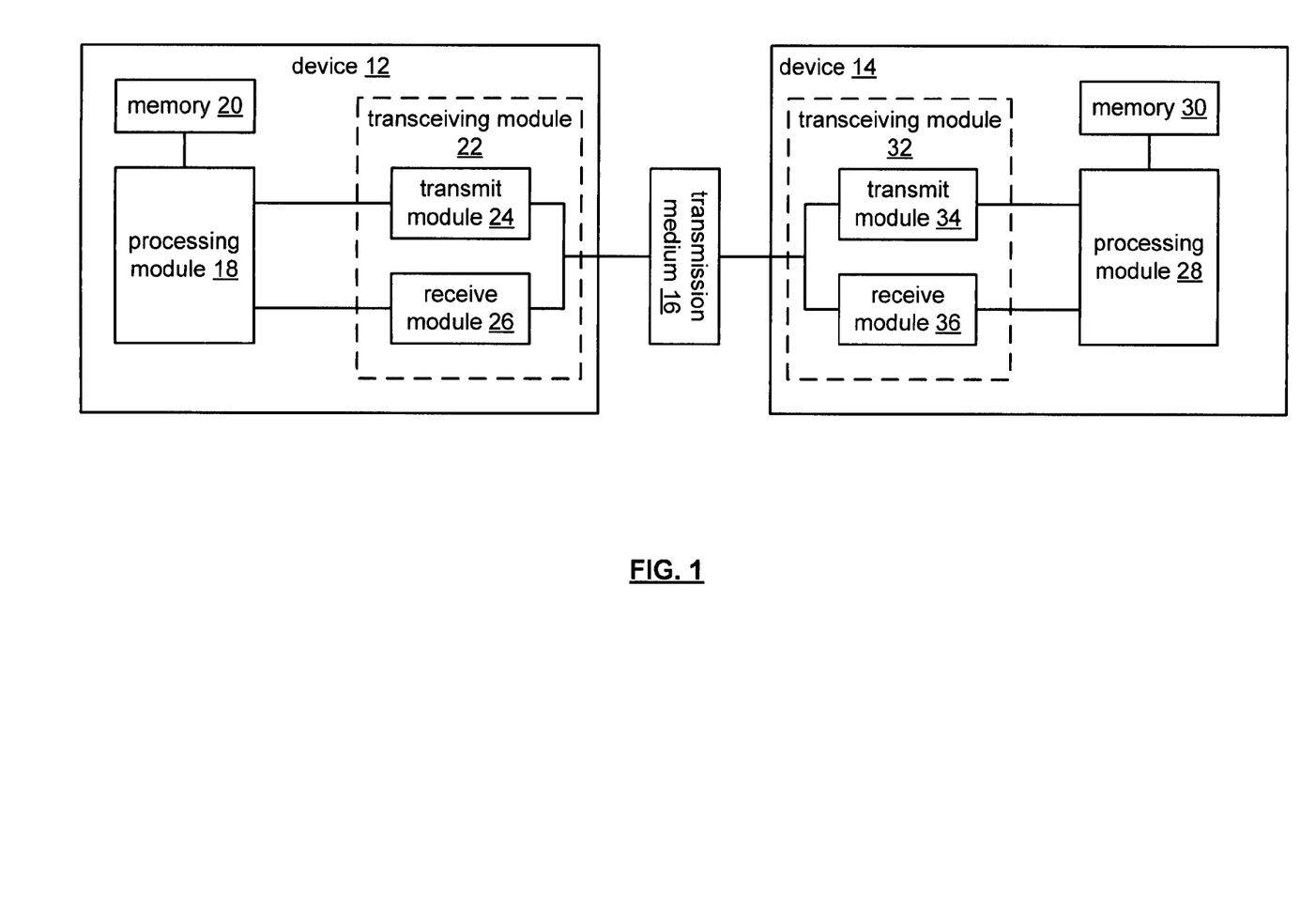
FIG. 1 depicts two communicating devices, which are coupled through a transmission medium and in which the present invention may be employed.

FIG. 1 illustrates two communicating devices 12 and 14, which exchange information through a transmission medium 16, for example a twisted pair cable. The devices comprise processing modules 18 and 28 with memories 20 and 30, respectively, and are coupled to the transmission medium through transceiving modules 22 and 32, respectively. The transceiving modules include transmit modules 24 and 34 and receive modules 26 and 36, respectively. In an Ethernet LAN system, one communicating device may be part of a switch and the other communicating device may be a network-attached station. The processing modules 18 and 28 may each be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 20 and 30 may each be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 18 or 28 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 2:
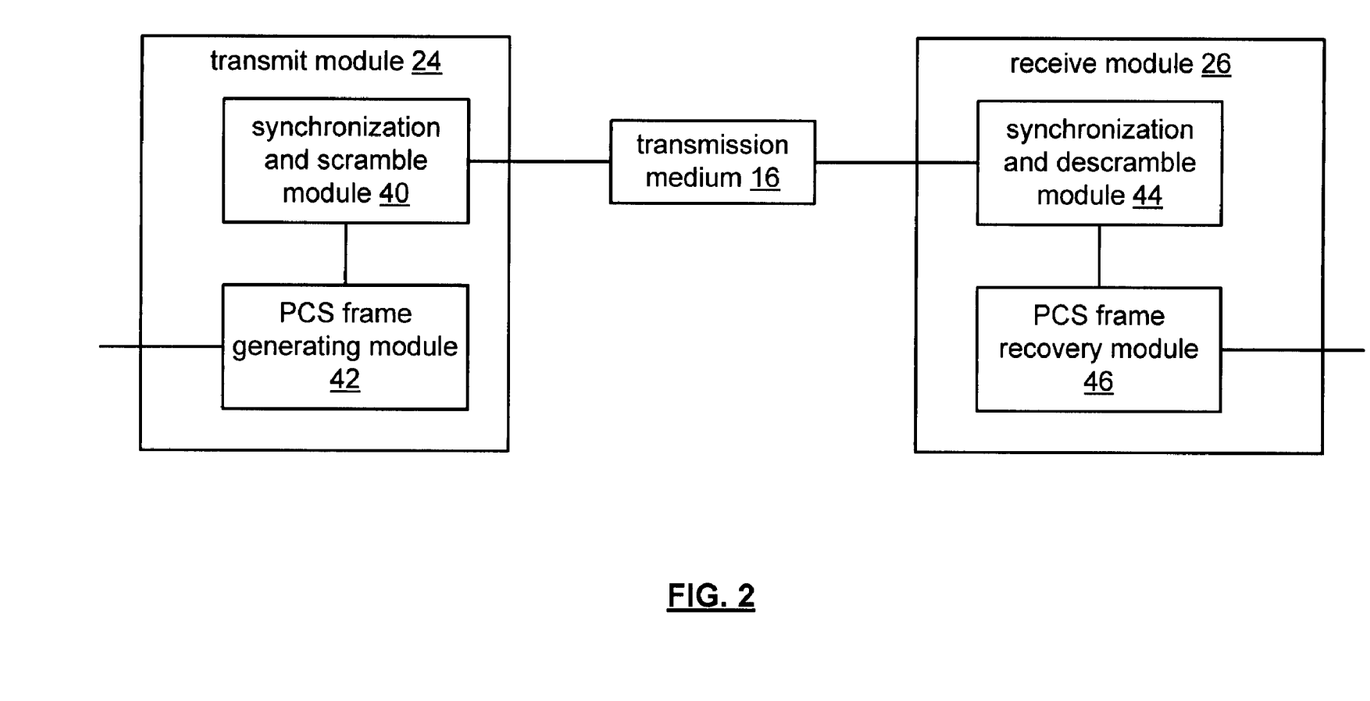
FIG. 2 shows a transmit module that sends signals to a receive module through a transmission medium in accordance with the present invention.

FIG. 2 shows a transmit module 24 that sends signals to a receive module 26 through a transmission medium 16. As is shown, the transmit module 24 includes a synchronization and scramble module 40 and a PCS (physical coding sublayer) frame generating module 42. The PCS frame generating module 42 is operably coupled to generate PCS frame payloads from data it receives from the processing module of the associated device. The synchronization and scramble module 40 scrambles the PCS frame payload and adds corresponding synchronization information to produce signal frames that are launched into the transmission medium 16. According to the present invention, the corresponding synchronization information is represented by one synchronization bit per frame. The remaining N bits in the frame constitute the scrambled PCS frame payload. The synchronization and scramble module 40 will be described in greater detail with reference to FIGS. 3, 5 and 6.

The receive module 36 includes a synchronization and descramble module 44 and a PCS frame recovery module 46. The synchronization and descramble module 44 is operably coupled to receive signal frames containing synchronizing information and the scrambled PCS frame payload. It establishes from the synchronization information the information required to descramble the PCS frame payload and provides the descrambled PCS frame payload to the PCS frame recovery module 46.

Figure 3:
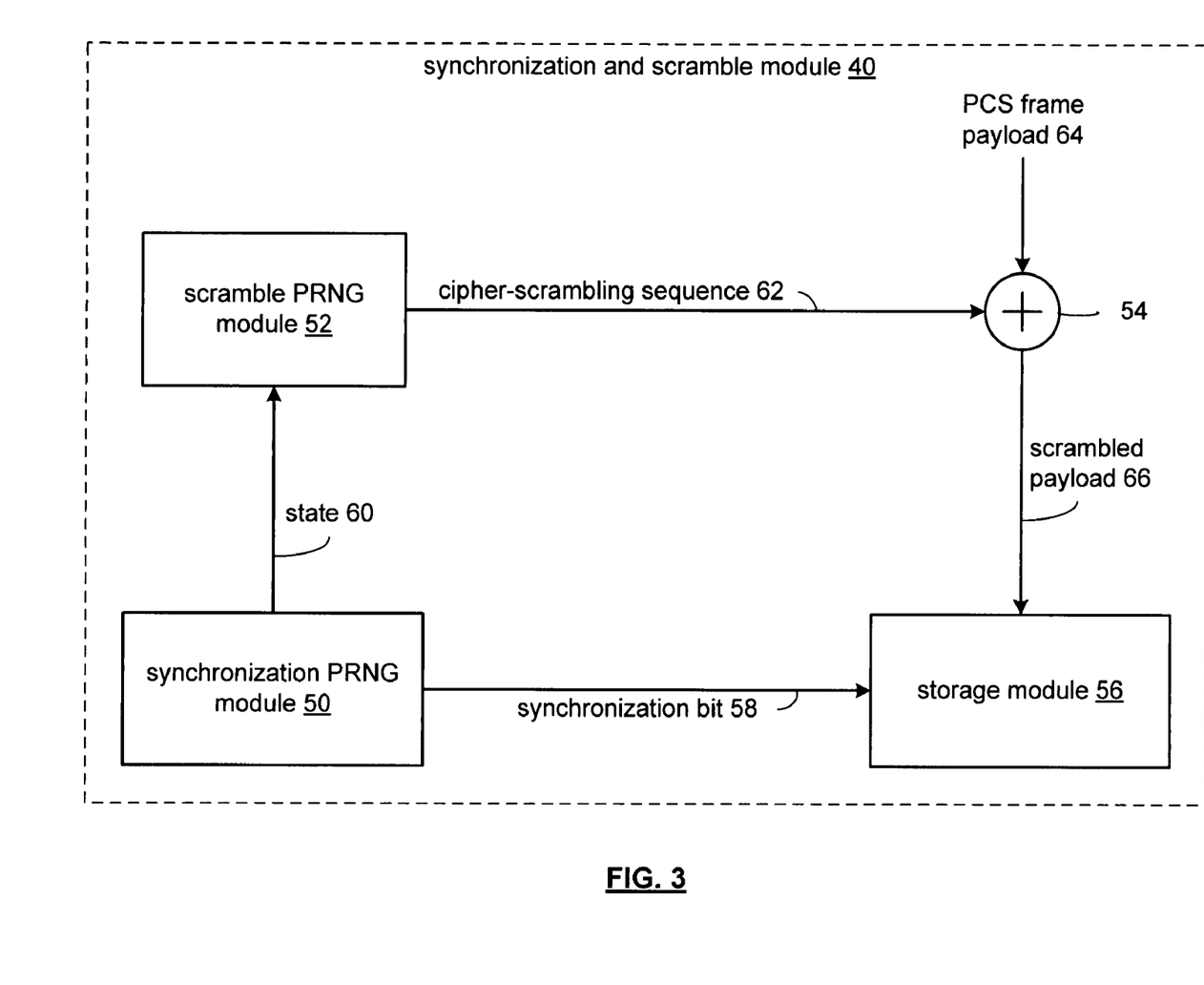
FIG. 3 presents a schematic block diagram of a synchronization and scramble module in accordance with the present invention.

FIG. 3 illustrates an embodiment of the synchronization and scramble module 40 that includes a synchronization PRNG module 50, a scramble PRNG module 52, a modulo-2 summing module 54, and a frame storage module 56. The synchronization PRNG module 50 is clocked once per PCS frame to generate one synchronization bit 58 per PCS frame. When clocked once per PCS frame, the synchronization PRNG transitions to a new state 60 consisting of an m-tuple of state bits. The state bits may simply be the last m synchronization bits, possibly reordered, or a transformed version of these bits with the property that the state can be recovered from a finite sequence of synchronization bits. This enables verification of PCS frame synchronization and fly-wheel re-synchronization in the receive module 26, 36.

The m-tuple of state bits is used to initialize the scramble PRNG module 52, which is then clocked once for each bit in the PCS frame payload to generate a cipher-scrambling sequence 62. The sequence 62 is bit-wise added modulo-2 in the summing module 54 to the PCS frame payload 64. The synchronization bit 58 and the scrambled payload 66 are inserted into the frame storage module 56, from where a signal frame is generated and launched into the transmission medium.

Figure 4:
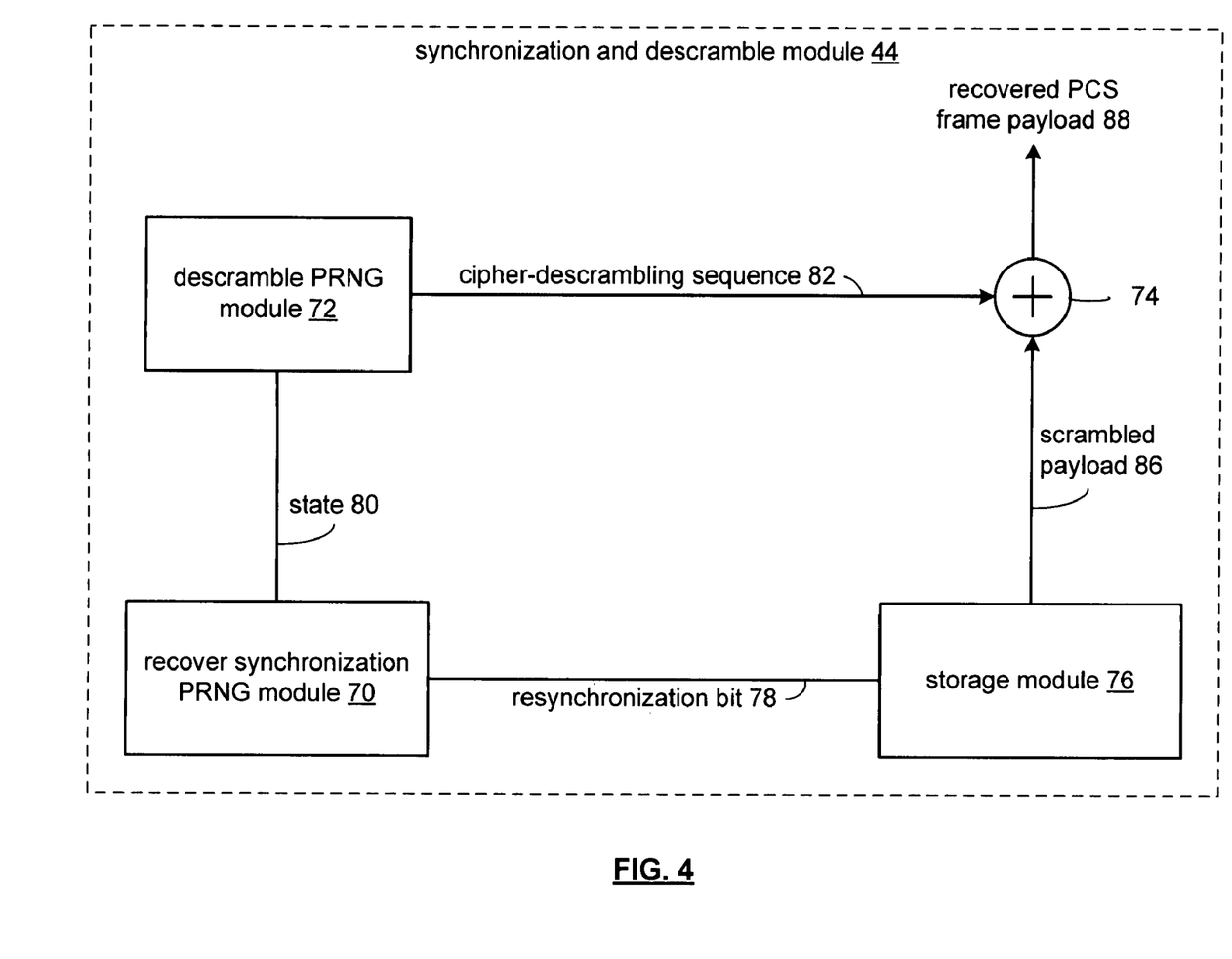
FIG. 4 presents a schematic block diagram of a recover-synchronization and descramble module in accordance with the present invention.

FIG. 4 depicts an embodiment of the synchronization and descramble module 44 that includes a recover-synchronization PRNG module 70, a descramble PRNG module 72, a modulo-2 summing module 74, and a frame storage module 76. In general, the operation of the synchronization and descramble module 44 is the inverse of the operation of the synchronization and scramble module 40.

A frame received via the transmission medium 16 is stored in the frame storage module 76. The recover-synchronization PRNG module 70 receives the synchronization bit 78 and assembles from this bit and previously received synchronization bits the state 80. Fly-wheel techniques can be used to recover the state 80 reliably in the presence of transmission errors. The m-tuple of state bits is used to initialize the descramble PRNG module 72, which is then clocked once for each bit in the PCS frame payload to generate the cipher-descrambling sequence 82. The sequence 82 is identical to the cipher-scrambling sequence 62 generated for that frame in the transmitter. The sequence 82 is bit-wise added modulo-2 in the summing module 74 to the received scrambled PCS payload 86 to obtain the recovered PCS frame payload 88.

Figure 5:
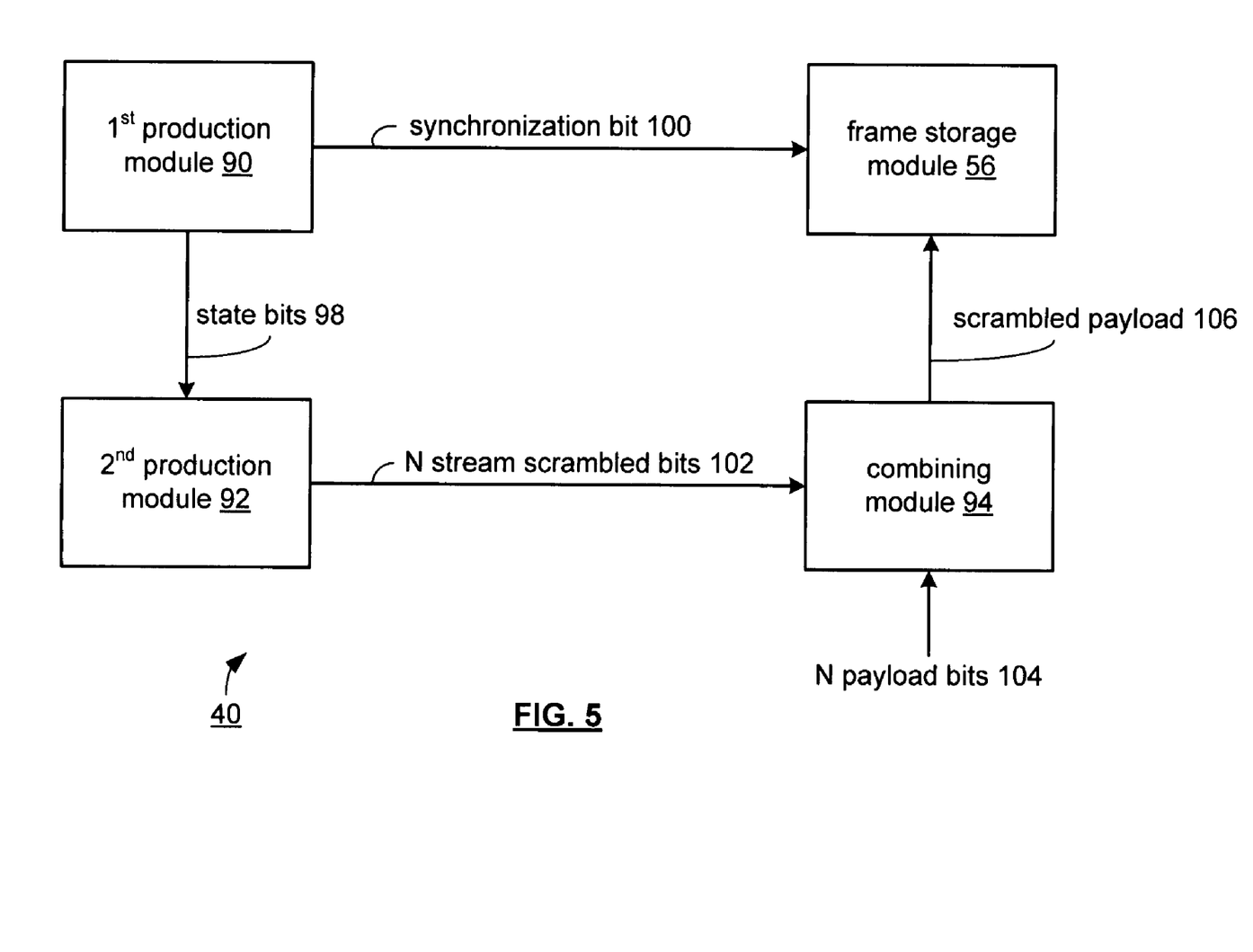
FIG. 5 presents a schematic block diagram of another embodiment of a synchronization and scramble module in accordance with the present invention.

FIG. 5 illustrates an embodiment of the synchronization and scramble module 40 that includes a $1^{st}$ production module 90, a $2^{nd}$ production module 92, a combining module 94, and the frame storage module 56. In general, the synchronization and scramble module 40 may be used in any system in which information is transmitted in frames. For every frame, the synchronization and scramble module 40 conveys one synchronization bit 100, N payload bits 104 and other bits onto the LAN connection. The $1^{st}$ production module 90 produces a new synchronization bit 100 for each frame and thereby transitions to a new state. Further at the beginning of each frame, the $2^{nd}$ production module 92 is initialized with state bits 98 of the 1st production module 90. The $2^{nd}$ production module 92 is then clocked N times to produce N stream scrambling bits 102, which are combined with N payload bits 104 of the frame by the combining module to produce a scrambled payload 106. The frame storage module 56 stores synchronization bit 100 and the scrambled payload 106 for subsequent transmission over the transmission medium.

Figure 6:
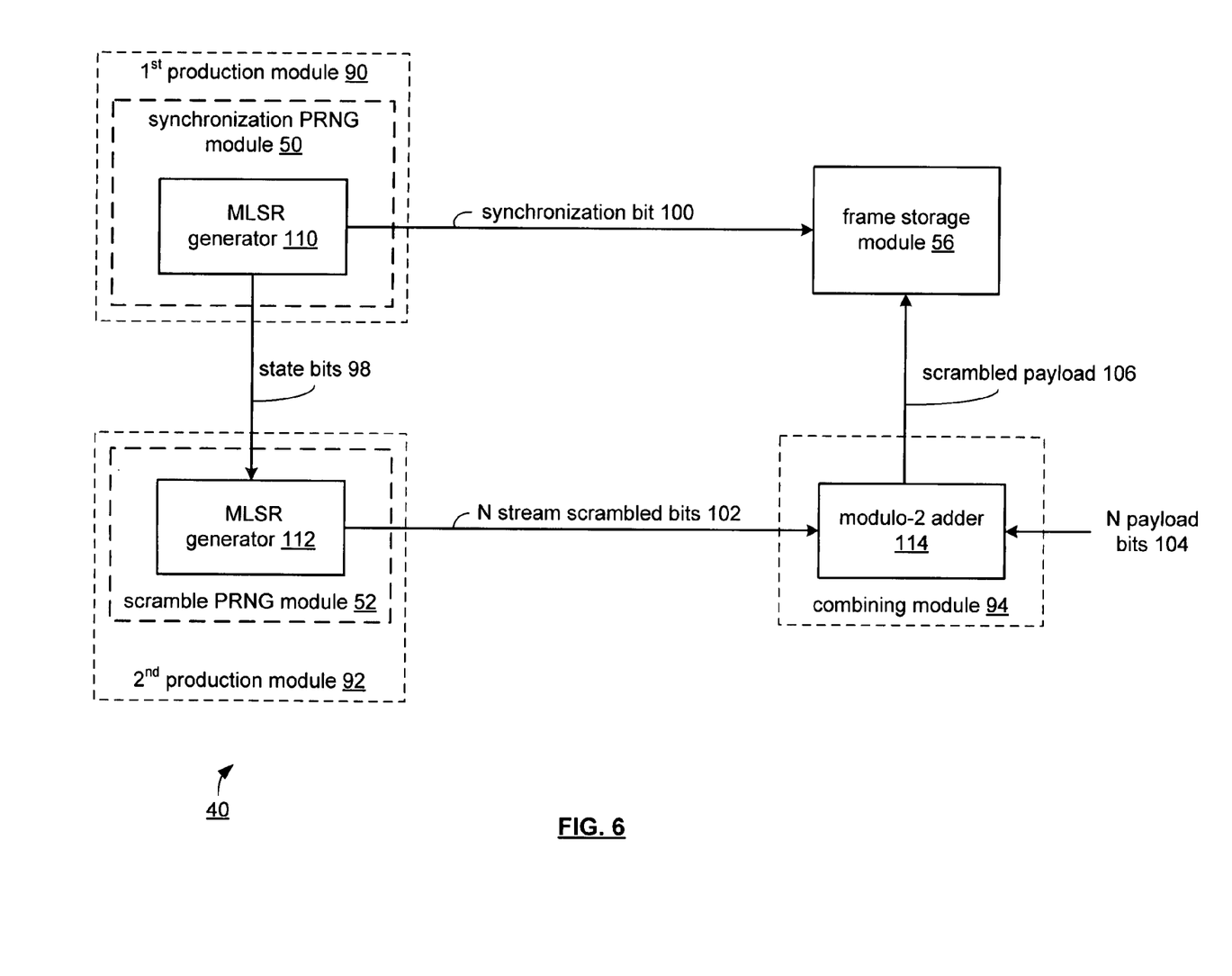
FIG. 6 presents a schematic block diagram of yet another embodiment of a synchronization and scramble module in accordance with the present invention.

FIG. 6 illustrates an embodiment of the synchronization and scramble module 40 that includes a $1^{st}$ production module 90, a $2^{nd}$ production module 92, a combining module 94, and the frame storage module 56. In the $1^{st}$ production module 90 the function of the synchronization PRNG module 52 may be accomplished by a Maximum Length Shift Register (MLSR) generator 110 that is clocked once per frame. In the $2^{nd}$ production module 92 the function of the scramble PRNG module 52 may also be realized by a Maximum Length Shift Register (MLSR) generator 112 that is initialized once per frame with the state bits 98 and then clocked N times. The combining module 94 includes a modulo-2 adder 114.

In this embodiment, the MLSR generators 110 and 112 have feedback connections that are determined by primitive polynomials of degree $m_1$ and $m_2$, respectively, where $m_1$ and $m_2$ may be identical. A MLSR generator with primitive-polynomial feedback of degree m generates a pseudo random binary sequence with period length $2^m-1$ comprising $2^{m-1}$ ones and $2^{m-1}-1$ zeros. The m state bits correspond to m consecutive output bits, and within one period the m-tuple of state bits cycles through all $2^m-1$ non-zero binary m-tuples.

The initialization of the scramble PRNG 52 defines the starting point of the subsequence of N scrambling bits within the $2^{m_2}-1$-periodic sequence that would be produced in continuous operation. For given primitive polynomials, the transfer of state bits from the synchronization PRNG 50 to the scramble PRNG 52 should occur in a manner such that the subsequences of N scrambling bits start at pseudo-randomly distributed starting points. This can be accomplished in various ways. One possibility is to let the two primitive polynomials be identical with degree m, and reverse the order of the m state bits transferred from the synchronization PRNG 50 to the scramble PRNG 52. Then the synchronization PRNG 50 generates a $2^m-1$-periodic sequence, and the Scramble PRNG 52 produces subsequences of length N starting at pseudo-randomly distributed points within the same $2^m-1$-periodic sequence. Since the state bits of the synchronization PRNG 50 cycle through all $2^m-1$ non-zero binary m-tuples, the length-N subsequences will start at all $2^m-1$ possible starting points. The m-bit state of the synchronization PRNG 50 is transmitted in a bit-serial manner, one bit per frame, as the synchronization bit 58, 100.

A similar effect will be achieved by choosing two primitive polynomials of same degree m with time-reversed coefficients relative to each other, and not reversing (i.e., maintained) the order of the transferred m state bits. The list of choices may be continued, for example, with pairs of primitive polynomials of same degree and non-time reversed coefficients, or primitive polynomials of different degrees and various ways to transfer state bits.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for achieving cipher-stream scrambling and descrambling in a frame-based transmission system with minimum synchronization overhead for generating identical cipher sequences of any desirable period length in a transmitter and a receiver. As one of ordinary skill in the art will appreciate, other embodiments may be derived from the teachings of the present invention without deviating from the scope of the claims.

What is claimed is:

1. A method for execution by a transmit module, the method comprises:
   producing a synchronization bit and state bits for a frame of frames by the transmit module, the state bits being produced from previous synchronization bits, the synchronization bit being produced separate from the state bits;
   producing N stream scrambling bits based on the state bits for the frame by the transmit module;
   combining the N stream scrambling bits with N payload bits of the frame to produce a scrambled payload by the transmit module; and
   storing the scrambled payload and the synchronization bit within a frame storage module of the transmit module.

2. The method of claim 1, wherein the combining the N stream scrambling bits with N payload bits of the frame comprises:
   modulo-2 adding the N stream scrambling bits with the N payload bits of the frame.

3. The method of claim 1 comprises:
   the producing the synchronization bit and the state bits for the frame is performed via a Synchronization Pseudo Random Number Generation process for the frames, such that a new synchronization bit is generated for each of the frames and transitions to a new state from frame to frame; and
   the producing the N stream scrambling bits is performed via a Scramble Pseudo Random Number Generation process that is initialized with the state bits and clocked N times per frame.

4. The method of claim 3, wherein the Synchronization Pseudo Random Number Generation process comprises:
   performing a continuously operating Maximum-Length Shift Register (MLSR) function with primitive-polynomial feedback of degree m to produce a pseudo random binary sequence with period length $2^m-1$ that includes $2^{m-1}$ ones and $2^{m-1}-1$ zeros, wherein the state bits include m preceding output bits, and, within one period, m-tuple of the state bits cycles through $2^m-1$ non-zero binary m-tuples.

5. The method of claim 3, wherein the Scramble Pseudo Random Number Generation process comprises:
   performing a continuously operating Maximum-Length Shift Register (MLSR) function with primitive-polynomial feedback of degree m to produce a pseudo random binary sequence with period length $2^m-1$ that includes $2^{m-1}$ ones and $2^{m-1}-1$ zeros, wherein m state bits include m preceding output bits, and, within one period, m-tuple of them state bits cycles through $2^m-1$ non-zero binary m-tuples.

6. The method of claim 3 comprises:
   initializing the Scramble Pseudo Random Number Generation process at a starting point of subsequence of the N scrambling bits within a $2^{m^2}-1$-periodic sequence in accordance with a continuous operation, where, for given primitive polynomials, transfer of the state bits from the Synchronization Pseudo Random Number Generation process to the Scramble Pseudo Random Number Generation process occurs in a manner such that the subsequences of the N scrambling bits start at pseudo-randomly distributed starting points, which include the starting point.

7. The method of claim 6 comprises:
   reversing order of the state bits transferred from the Synchronization Pseudo Random Number Generation process to the Scramble Pseudo Random Number Generation process when the given primitive polynomials includes two primitive polynomials that are identical with degree m;
   generating a $2^m-1$-periodic sequence by the Synchronization Pseudo Random Number Generation process; and
   producing, by the Scramble Pseudo Random Number Generation process, the subsequences of length N starting at pseudo-randomly distributed points within the $2^m-1$-periodic sequence, wherein the state bits produced via the Synchronization Pseudo Random Number Generation process cycle through $2^m-1$ non-zero binary m-tuples and length-N subsequences includes $2^m-1$ starting points.

8. The method of claim 6 comprises:
maintaining order of transferring the state bits from the Synchronization Pseudo Random Number Generation process to the Scramble Pseudo Random Number Generation process when the given primitive polynomials includes two primitive polynomials of same degree m with time-reversed coefficients relative to each of the two primitive polynomials.

9. An apparatus comprises:
a first production module coupled to produce a synchronization bit and state bits for a frame of frames, the state bits being produced from previous synchronization bits, the synchronization bit being produced separate from the state bits;
a second production module coupled to produce N stream scrambling bits based on the state bits for the frame;
a combining module coupled to combine the N stream scrambling bits with N payload bits of the frame to produce a scrambled payload; and
a frame storage module coupled to store the scrambled payload and the synchronization bit.

10. The apparatus of claim 9, wherein the combining module comprises:
a modulo-2 adder coupled to add the N stream scrambling bits with the N payload bits of the frame.

11. The apparatus of claim 9 further comprises:
the first production module including a Synchronization Pseudo Random Number Generation (PRNG), where the Synchronization PRNG generates the synchronization bit and the state bits for the frame for other frame of the frames such that a new synchronization bit is generated for each of the frames and transitions to a new state from frame to frame; and
the second production module including a Scramble Pseudo Random Number Generation (PRNG), wherein the Scramble PRNG is initialized with the state bits and clocked N times per frame to generate the N stream scrambling bits.

12. The apparatus of claim 11, wherein the Synchronization Pseudo Random Number Generation comprises:
a continuously operating Maximum-Length Shift Register (MLSR) with primitive-polynomial feedback of degree m to produce a pseudo random binary sequence with period length $2^m-1$ that includes $2^{m-1}$ ones and $2m^{-1}-1$ zeros, wherein the state bits include m preceding output bits, and, within one period, m-tuple of the state bits cycles through $2^m-1$ non-zero binary m-tuples.

13. The apparatus of claim 11, wherein the Scramble Pseudo Random Number Generation comprises:
a continuously operating Maximum-Length Shift Register (MLSR) with primitive-polynomial feedback of degree m to produce a pseudo random binary sequence with period length $2^m-1$ that includes $2^{m-1}$ ones and $2^{m-1}-1$ zeros, wherein m state bits include m preceding output bits, and, within one period, m-tuple of the m state bits cycles through $2^m-1$ non-zero binary m-tuples.

14. The apparatus of claim 11, wherein the Scramble Pseudo Random Number Generation further functions to:
initialize at a starting point of subsequence of the N scrambling bits within a $2^{m^2}-1$-periodic sequence in accordance with a continuous operation, where, for given primitive polynomials, transfer of the state bits from the Synchronization Pseudo Random Number Generation to the Scramble Pseudo Random Number Generation occurs in a manner such that the subsequences of the N scrambling bits start at pseudo-randomly distributed starting points, which including the starting point.

15. The apparatus of claim 11, wherein the Synchronization Pseudo Random Number Generation further functions to:
reverse order of the state bits transferred to the Scramble Pseudo Random Number Generation when the given primitive polynomials includes two primitive polynomials that are identical with degree m;
generate a $2^m-1$-periodic sequence; and
produce the subsequences of length N starting at pseudo-randomly distributed points within the $2^m-1$-periodic sequence, wherein the state bits cycle through $2^m-1$ non-zero binary m-tuples and length-N subsequences includes $2^m-1$ starting points.

16. The apparatus of claim 11, wherein the Synchronization Pseudo Random Number Generation further functions to:
maintain order of transferring the state bits to the Scramble Pseudo Random Number Generation when the given primitive polynomials includes two primitive polynomials of same degree m with time-reversed coefficients relative to each of the two primitive polynomials.

17. A two-stage block synchronization and scrambling module comprises:
a synchronization pseudo random number generation (PRNG) module clocked once per physical coding sublayer (PCS) frame to produce a synchronization bit and state bits, the state bits being produced from previous synchronization bits, the synchronization bit being produced separate from the state bits;
a scramble PRNG module clocked N times per PCS frame to produce a cipher stream based on the state bits;
summing module operably coupled to sum the cipher stream and a PCS frame payload to produce scrambled payload; and
scramble module operably coupled to store the scrambled payload and the synchronization bit.

18. The two-stage block synchronization and scrambling module of claim 17, wherein the synchronization PRNG comprises:
a continuously operating Maximum-Length Shift Register (MLSR) with primitive-polynomial feedback of degree m to produce a pseudo random binary sequence with period length $2^m-1$ that includes $2^{m-1}$ ones and $2^{m-1}-1$ zeros, wherein the state bits include m preceding output bits, and, within one period, m-tuple of the state bits cycles through $2^m-1$ non-zero binary m-tuples.

19. The two-stage block synchronization and scrambling module of claim 17, wherein the scramble PRNG comprises:
a continuously operating Maximum-Length Shift Register (MLSR) with primitive polynomial feedback of degree m to produce a pseudo random binary sequence with period length $2^m-1$ that includes $2^{m-1}$ ones and $2^{m-1}-1$ zeros, wherein m state bits include m preceding output bits, and, within one period, m-tuple of the m state bits cycles through $2^m-1$ non-zero binary m-tuples.

20. The two-stage block synchronization and scrambling module of claim 17, wherein the summing module comprises:
a modulo-2 adder.

* * * * *